United States Patent Office 2,837,402
Patented June 3, 1958

2,837,402

METHOD OF REDUCING PLUTONIUM COMPOUNDS

Iral B. Johns, Dayton, Ohio, assignor to the United States of America as represented by the United States Atomic Energy Commission No Drawing. Application October 17, 1947
Serial No. 780,586

6 Claims. (Cl. 23—14.5)

This invention relates to a method for adjusting the valence state of plutonium (element 94) and more particularly to methods of reducing plutonium compounds in aqueous solution from a higher to a lower valence state.

It is frequently desired to reduce a higher valence plutonium compound to a lower valence compound. This may be necessary not only to prepare these lower valence compounds as such, but also as a means of separating plutonium from impurities. The separation may be accomplished by reducing higher valence soluble plutonium compounds to lower valence insoluble plutonium compounds.

There are several methods known for reducing plutonium from the higher oxidation states to the lower oxidation state but up to the time of this invention these methods had various objections. These objections included the introduction of undesirable ions and the difficulty of maintaining special conditions.

The object of this invention is to provide a simple, efficient method for reducing plutonium compounds from the higher valence states to the lower valence states without introducing undesirable ions.

Another object of this invention is to provide a simple, efficient method for reducing plus six and plus four plutonium compounds in solution to the plus three state without introducing undesirable ions.

Still further objects and advantages of this invention will appear in the following description.

The objects of this invention are achieved by the step which comprises treating an aqueous solution of higher valence plutonium compounds with hydrogen in contact with activated platinum.

More specifically the process is carried out as follows: An activated platinum catalyst, such as platinum black, is prepared, for example, in accordance with the methods suggested by Roger Adams, V. Voorhies and R. L. Shriner on page 463 et seq. of Organic Syntheses Collective Volume I, second edition, 1941. Plutonium in the plus four or plus six state in dilute hydrochloric acid is placed in a container with the platinum catalyst. Hydrogen is then slowly introduced intto the container through a tube extending into the catalyst. The gas flow continues until the plutonium is reduced to the plus three state. The catalyst, e. g. platinum black, may be removed from the solution by suitable means, such as by filtration, leaving the plutonium in solution in the plus three state. If it is desired to remove the plutonium as an insoluble compound an anion which forms an insoluble plus three compound is then added.

Because it is often desirable to limit the concentration of sodium in the final plutonium compound, experience has indicated that it is more desirable to use potassium nitrate than the sodium nitrate suggested in the article listed supra in the preparation of the platinum black. This is actually an advantage because the black platinum catalyst may be made more active by using potassium nitrate.

The following is an example of one embodiment of the method of this invention but is not intended to be limiting on the scope thereof.

Example I

About ½ gram of Adams black platinum catalyst is prepared in the following manner. One gram of chloroplatinic acid, 3 milliliters of water and 10 grams of potassium nitrate are placed in a Pyrex casserole. The mixture is heated slowly to dryness in the Pyrex casserole and is then fused with a Meker burner. Copious brown fumes are given off during this treatment. When the fumes cease, heating is continued for about 30 minutes at about 500° C. The mixture is then extracted four times with about 20 milliliters of water. The solution is then dried in a Buchner funnel. The platinum oxide which results is a fine dark brown powder. The powder is transferred into the bottom of a tall cylindrical container, such as a large test tube, which contains about 1 milliliter of 1 normal hydrochloric acid. About 650 milliliters per minute of hydrogen are bubbled through a small tube which reaches within 2 millimeters of the bottom of the container. The hydrogen reduces the brown platinum oxide powder to a very finely divided platinum powder known as platinum black. The platinum black is a very efficient catalyst with an exceedingly great surface area. The reduction of the platinum oxide is complete in about 10 minutes, thus requiring about a 33 fold excess over the stoichiometric amount of hydrogen necessary for this reaction.

About 15 milligrams of plus four plutonium in about 1 normal hydrochloric acid is then added to the container. Hydrogen at a rate of about 1 liter per minute is then bubbled through the tube for about 40 minutes. The plutonium changes from the green plus four to the purple plus three state. The platinum black is separated from the solution by filtration, centrifugation or decantation or any other of the methods known to those skilled in the art. This is easily accomplished since the platinum black coagulates and settles well.

In other embodiments of the method of this invention it is of course possible to vary the conditions given in Example I. As an example, it is not necessary to start with the plutonium in the plus four oxidation state, but instead it may be in the plus six state or in a mixed higher oxidation state. As another example, the reduction can be achieved in a closed system with provisions for constant agitation of the solution in the presence of the hydrogen.

In like manner it is not necessary to prepare the platinum black catalyst every time since it is possible to reuse the platinum catalyst. However, the catalyst may become poisoned or spent. Even in that case, it is often possible to rework and repurify the catalyst.

In still other embodiments the black platinum may be partially prepared. The brown platinum oxide powder which is formed by the fusing of the potassium nitrate and the chloroplatinic acid may be placed in the container containing the plus six and the plus four plutonium in solution. The tube may be inserted and positioned with one of its openings near the bottom of the container and hydrogen may be introduced into the container through this opening. The hydrogen flow is continued for about 3 hours in order to prepare the black platinum and to reduce the plutonium to the plus three valence state.

It is also possible in other embodiments of the method of this invention to reduce the plutonium to the plus three state, remove the platinum black, and then add an anion such as a soluble oxalate or a fluoride which forms an insoluble plus three plutonium compound. The insoluble precipitate may then be removed by filtration, decantation, centrifugation, or any of the other methods known to those skilled in the arts. It is also possible to add the anion which forms an insoluble plus three compound before the reduction of the plutonium thus forming the precipitate as the reduction proceeds. Concurrent and countercurrent procedures for continuous treatment of the solution with the gas in the presence of the catalyst may also be used.

Activated platinum prepared in accordance with methods other than those cited specifically hereinbefore for the preparation of the activated platinum commonly known as black platinum can similarly be employed.

The foregoing example and procedures are given for the purpose of illustrating the present invention but are not intended to be limiting on the scope thereof. Because many widely different embodiments of the invention can be made without departing from the spirit and scope thereof, it is to be understood that this application is not to be limited except as indicated in the appended claims.

What is claimed is:

1. The process of purifying plutonium which comprises reducing higher valence plutonium to the plus three state by passing hydrogen over black platinum powder in a higher valence plutonium solution, removing the platinum black, adding an anion which forms an insoluble plus three plutonium compound, and removing the insoluble plus three compound.

2. The process of purifying plutonium which comprises reducing higher valence plutonium to the plus three state by passing hydrogen over black platinum powder in a solution containing the higher valence plutonium, removing the platinum, adding a soluble oxalate which forms an insoluble plus three plutonium oxalate, and removing the insoluble plus three oxalate.

3. The process of reducing higher valence plutonium to lower valence plutonium which comprises passing hydrogen over an activated platinum surface immersed in a higher valence plutonium solution until substantially all of the higher valence plutonium present has been reduced to the plus three valence state.

4. The process of reducing higher valence plutonium in solution to a lower valence state which comprises passing hydrogen over activated platinum immersed in a solution of higher valence plutonium at a rate of about one liter per minute until substantially all the plutonium has been reduced to the plus three valence state.

5. The process of reducing higher valence plutonium in solution to a lower valence state which comprises passing hydrogen over activated platinum immersed in a solution of higher valence plutonium at the rate of one liter of hydrogen per minute for about 40 minutes until substantially all the plutonium has been reduced to the plus three state.

6. The process of reducing plus four plutonium ions in solution to the plus three valence state which comprises passing hydrogen over activated platinum immersed in a solution of plus four plutonium ions at the rate of about one liter per minute for about 40 minutes until the plus four plutonium ions have been reduced to the plus three valence state.

References Cited in the file of this patent

Connick et al.: U. S. Atomic Energy Commission Declassified Paper No. MDDC–1367, 3 pp., declassified Oct. 13, 1947.

Harvey et al.: Journal of the Chemical Society, August 1947, p. 1011.

Seaborg et al.: Journal of the American Chemical Society, vol. 70, pp. 1128–1134 (1948). Footnote date: Mar. 21, 1942.

Hildebrand: Journal of the American Chemical Society, vol. 35, pp. 848–851 (1913).

Mellor: Comprehensive Treatise on Inorganic and Theoretical Chemistry, vol. I, p. 330 (1922).

Handbook of Chemistry and Physics, 26th ed., p. 1337–8 (1942), Chemical Rubber Publ. Co., Cleveland, Ohio.

Seaborg: Chemical and Engineering News, Dec. 10, 1945, vol. 23, pp. 2190–3.